United States Patent
Jordan et al.

(10) Patent No.: US 8,146,867 B2
(45) Date of Patent: Apr. 3, 2012

(54) MODULAR SPACECRAFT DESIGN ARCHITECTURE

(75) Inventors: Luis G. Jordan, Charles Town, WV (US); Thomas W. Vaneck, Gloucester, MA (US); Scott A. McDermott, Washington, DC (US); Jonathon Miller, Sterling, VA (US); Simon Morris Shand Weiss, Boston, MA (US); Robert A. Summers, Dayton, MD (US)

(73) Assignee: AeroAstro, Inc., Ashburn, VA (US)

( * ) Notice: Subject to any disclaimer, the term of this patent is extended or adjusted under 35 U.S.C. 154(b) by 1304 days.

(21) Appl. No.: 11/151,906

(22) Filed: Jun. 14, 2005

(65) Prior Publication Data

US 2006/0016935 A1    Jan. 26, 2006

Related U.S. Application Data

(60) Provisional application No. 60/579,231, filed on Jun. 14, 2004.

(51) Int. Cl.
   *B64G 1/22*    (2006.01)
(52) U.S. Cl. .................................................. 244/159.4
(58) Field of Classification Search ............... 244/172.6, 244/172.7, 172.5, 159.4, 173.1, 171.8
   See application file for complete search history.

(56) References Cited

U.S. PATENT DOCUMENTS

| | | | | |
|---|---|---|---|---|
| 3,364,631 A | * | 1/1968 | Pleasants | 52/2.22 |
| 3,423,748 A | * | 1/1969 | Hansen et al. | 340/507 |
| 3,459,391 A | * | 8/1969 | Haynos | 244/172.7 |
| 3,749,156 A | | 7/1973 | Fletcher et al. | |
| 3,772,545 A | * | 11/1973 | Hatschek | 310/71 |
| 3,778,312 A | * | 12/1973 | Karius | 136/245 |
| 4,508,404 A | * | 4/1985 | Frawley | 439/153 |
| 4,880,050 A | | 11/1989 | Nakamura et al. | |
| 5,050,821 A | * | 9/1991 | Kerstein et al. | 244/173.1 |
| 5,159,218 A | * | 10/1992 | Murry et al. | 310/68 B |
| 5,271,582 A | * | 12/1993 | Perkins et al. | 244/173.1 |
| 5,372,183 A | | 12/1994 | Strickberger | |
| 5,372,340 A | * | 12/1994 | Ihara et al. | 244/172.5 |
| 5,647,561 A | * | 7/1997 | Robinson et al. | 244/173.1 |
| 5,806,803 A | * | 9/1998 | Watts | 244/171.8 |
| 5,884,027 A | * | 3/1999 | Garbus et al. | 709/250 |
| 5,979,833 A | | 11/1999 | Eller et al. | |
| 6,206,327 B1 | * | 3/2001 | Benedetti et al. | 244/159.4 |
| 6,260,804 B1 | * | 7/2001 | Anderson et al. | 244/159.4 |
| 6,433,319 B1 | * | 8/2002 | Bullock et al. | 219/543 |
| 6,494,407 B2 | * | 12/2002 | Arulf | 244/173.1 |
| 6,726,151 B2 | | 4/2004 | Hebert | |

OTHER PUBLICATIONS

U.S. Appl. No. 11/151,909, filed Jun. 14, 2005, McDermott et al.
U.S. Appl. No. 11/151,908, filed Jun. 14, 2005, Barton et al.

* cited by examiner

*Primary Examiner* — Tien Dinh
(74) *Attorney, Agent, or Firm* — Robert M. McDermott (57) ABSTRACT

A spacecraft architecture and accompanying standard allows for the creation of a spacecraft using an assortment of modules that comply with the standard. The standard preferably includes both mechanical and electrical compatibility criteria. To assure physical/mechanical compatibility, the structure of each module is constrained to be compatible with any other compatible module. To minimize the interference among modules, the extent of each module in select dimensions is also constrained. To assure functional compatibility, a common communication format is used to interface with each module, and each public-function module is configured to respond to requests for function capabilities that it can provide to other functions. Each module is preferably designed to provide structural support to the assemblage of modules, and an anchor module is provided or defined for supporting the entire assemblage and coupling the assemblage to other structures, such as a launch vehicle.

74 Claims, 3 Drawing Sheets

MODULAR SPACECRAFT DESIGN ARCHITECTURE

This application claims the benefit of U.S. Provisional Patent Application 60/579,231, filed 14 Jun. 2004.

This invention was made with U.S. Government support under Contract No. FA9453-04-C-0218 awarded by the U.S. Air Force. The U.S. Government has certain rights in the invention.

BACKGROUND AND SUMMARY OF THE INVENTION

This invention relates to the field of satellite and spacecraft design, and in particular to a design architecture that provides a cross-mission set of modules and design rules that minimize the delay time between the definition of requirements and the launch of a spacecraft that satisfies these requirements.

There is an increasing need for rapid requirements-to-launch turn-around time for deploying spacecraft. In military applications, for example, dynamic changes in political or military situations often result in a need for surveillance and/or communications satellites in orbits having particular coverage areas, with different situations requiring different satellite capabilities. In research applications, universities or other agencies often require spacecraft platforms that are easy-to-configure to support particular research objectives. In each of these applications, and others, there is a need to launch a payload without incurring the substantial time and costs associated with the development of a spacecraft to support the payload.

U.S. Pat. No. 6,283,416, "SPACECRAFT KERNEL", issued 4 Sep. 2002 to Richard D. Fleeter and Scott A. McDermott, and incorporated by reference herein, teaches the advantages of designing and providing a spacecraft interface with kernel components on one side of the interface, and components that depend on either the spacecraft configuration or the mission-specific system on the other side of the interface. The kernel components are both functionally and physically independent of the vehicle configuration and function, and physically independent of the mission-specific system. The kernel components typically include communications equipment for communicating with an earth station, a power management system for receiving variable power input and providing regulated power output, and a processing system that receives commands from the earth station and provides corresponding commands to other subsystems, on both sides of the interface, in a standard format. By providing communications, power management, and command processing in a kernel that is independent of the spacecraft configuration and the spacecraft's mission, the same kernel can be used on multiple spacecraft, thereby reducing the time and cost associated with the design and testing of new spacecraft, as well as potentially reducing manufacturing cost.

Although the spacecraft kernel design architecture provides a means to provide potentially re-usable designs, it does not necessarily provide for rapid development of a spacecraft. As noted above, the kernel components are independent of the space vehicle's configuration. However, the packaging of one set of kernel components for a given space vehicle's configuration may be unsuitable for use in another space vehicle. Correspondingly, a re-packaging of the kernel components for a given configuration typically requires substantial mechanical design and testing time, and may not be able to take advantage of prior tests or certifications conducted with the original configuration of the kernel components.

In like manner, by limiting the re-usable kernel components to those items that are independent of the spacecraft configuration, the number of potentially re-usable designs is substantially reduced. Most spacecraft, for example, use solar panels to provide the energy required to operate the spacecraft and mission-specific components. However, because the spacecraft configuration typically dictates how and where such panels can be placed relative to the other components, most solar panel arrangements are custom-designed for each spacecraft.

U.S. Pat. No. 6,260,804, "FUNCTIONALLY AND STRUCTURALY MODULAR PARALLELOGRAM-SHAPED SPACECRAFT", issued 17 Jul. 2001 to Anderson et al., and incorporated by reference herein, discloses a modular spacecraft design wherein each functional module of the spacecraft can be independently manufactured. Each module has a similar cross-section, so that the modules can be assembled into a spacecraft by stacking them along the vertical axis. Flats are provided at the vertices of the parallelogram-shaped modules for connection to vertical channel members that serve to join the modules together. This referenced patent does not address the design of each module, and of particular note, does not address the functional interface among the modules, other than to note that the channel members facilitate the routing of electrical cables. That is, the modular mechanical design of this referenced patent provides a structure that facilitates the independent manufacture of functional components, and potentially the rapid assembly of these components, but does not address techniques for reducing the time to design a spacecraft based on a given set of functional requirements.

It is an object of this invention to provide a spacecraft architecture that facilitates rapid requirements-to-launch turnaround time. It is a further object of this invention to provide a spacecraft architecture that facilitates the use of previously designed and tested modules in a variety of configurations. It is a further object of this invention to provide a standard for spacecraft design that optimizes the potential for the use of designed modules in other spacecraft.

These objects, and others, are achieved by a spacecraft architecture and accompanying standard that allows for the creation of a spacecraft using an assortment of modules that comply with the standard. The standard preferably includes both mechanical and electrical compatibility criteria. To assure physical/mechanical compatibility, the structure of each module is constrained to be compatible with any other compatible module. To minimize the interference among modules, the extent of each module in select dimensions is also constrained. To assure functional compatibility, a common communication format is used to interface each module, and each public-function module is configured to respond to requests for function capabilities that it can provide to other modules. Each module is preferably designed to provide structural support to the assemblage of modules, and an anchor module is provided or defined for supporting the entire assemblage and coupling the assemblage to other structures, such as a launch vehicle.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1A:
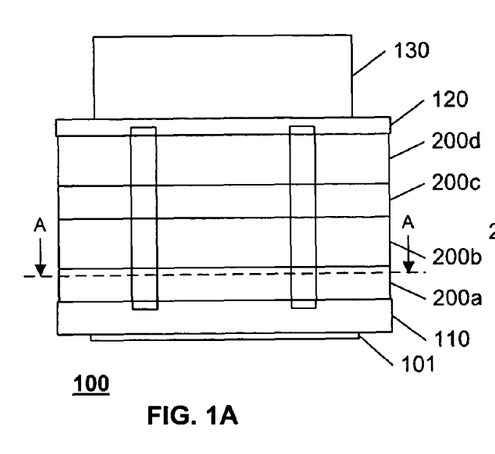
FIGS. 1A-1B illustrate an example spacecraft comprising a stack of modules in accordance with this invention.
Figure 1B:
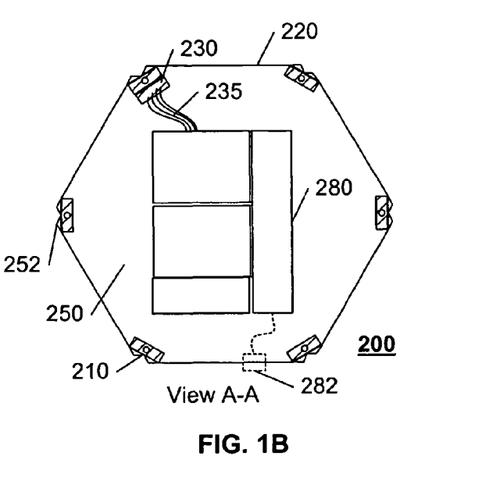

FIGS. 1A-1B illustrate an example spacecraft comprising a stack of modules in accordance with this invention. The stack of modules includes an anchor module 110, an upper module 120, and a plurality of intermediate modules 200(a-d) between the anchor and upper modules. Typically, the stack of modules will include a communications module, an attitude determination module, an attitude control module, a power supply module, and a solar panel module. Preferably, alternative configurations of each of these modules are available, and the spacecraft system designer selects from among these configurations to satisfy the given mission objective. For example, the attitude determination and control modules may be a momentum-biased earth-pointer, a three-axis stabilized star pointer, and so on, each having a particular accuracy and resolution, and each consuming different power. The solar panel and power supply modules may each have different capacity, power, voltage, and so on. The spacecraft system designer selects the appropriate combination of modules to satisfy the mission objectives, knowing that the modules are designed to be compatible with each other.

Each of the intermediate modules 200 has a common cross-section profile, so that they can be interchangeably stacked. Each of the intermediate modules is also structured such that, when they are coupled together, and coupled to the anchor and upper modules, a structural integrity is formed that extends across the entirety of the modules. Preferably, the structure of each module does not limit its availability for placement anywhere within the stack of modules, so that the structural integrity of the stack of modules is not dependent upon the order of placement of the intermediate modules 200.

The anchor module 110 preferably includes a coupling device 101 that facilitates the coupling to a launch vehicle, or other structure that serves to facilitate the deployment of the spacecraft. A "lightband" coupling device, as described in U.S. Pat. No. 6,390,416, "REUSABLE, SEPARABLE, STRUCTURAL CONNECTOR ASSEMBLY", issued 21 May 2002 to Walter Holemans, is particularly well suited to provide this coupling.

If there are functions of the spacecraft that cannot be provided by the modules 200a-d, a mission-specific payload 130 provides these functions. The upper module 130 is preferably configured to facilitate the coupling of such a payload to the spacecraft. Optionally, a payload module can be designed that conforms to the aforementioned structural constraints of the intermediate modules 200a-d, and placed within the stack as another intermediate module, or as the anchor 110 or upper 120 module.

FIG. 1B illustrates a preferred cross-section profile of the modules 200. As contrast to the four-sided profile of U.S. Pat. No. 6,260,804, referenced above, the preferred profile of the modules 200 is substantially hexagonal. Generally, spacecraft use solar panels that are deployed perpendicular to alternate surfaces or vertices of the spacecraft. Alternate surfaces or vertices are used so as to avoid a complete occlusion of "view" by the solar panels. However, limiting the view to two of four orientations often introduces design and operational constraints, particularly if the view from the un-occluded surface must include a particular target. By providing a polygon shape of six sides, or more, with solar panels deployed perpendicular to alternate sides, the feasibility of providing un-occluded views that encompass any target area is substantially increased. Consider, for example, an optical system that includes cameras at each un-occluded area. In order to include any target area from a four-sided spacecraft with alternate solar panels, each camera would require a full 180° field of view; otherwise, the spacecraft must be appropriately oriented to aim a camera with a smaller field of view toward the target. In a six sided system with alternate solar panels, each camera need only have a 120° field of view, thereby reducing the likelihood of requiring a reorientation of the spacecraft to capture a particular target. In like manner, an eight-sided system will allow four cameras with 90° fields of view to be used, and so on.

Note that the sides of the spacecraft need not be flat, and the "shape" of the spacecraft as defined herein relates to the "functional" shape, rather than a strict geometric interpretation. For example, the shape of the profile in FIG. 1B is defined as being substantially hexagonal, even though the flats at each vertex of the hexagon shape result in the profile being twelve-sided, which does not satisfy the geometric definition of a hexagon. In like manner, if the walls 220 and supports 210 were curved, the strict geometric definition might be a circular shape, whereas for the purposes of this disclosure, the placement of the six supports 210 partition the perimeter into six segments, thereby providing a functional partitioning that is substantially hexagonal, as the term hexagonal is used herein. In general, the supporting structure (e.g. the arrangement of supports 220) of each component defines its functional shape, and in a preferred embodiment, the supporting structure of each component has a common form, varying only in height.

A base plate 250 provides a mounting surface for the functional components 280 in each module 200, and also provides the structural support to supports 210 arranged at the perimeter of the module 200. The base plate 250 includes "V" shaped notches 252 at each vertex, to facilitate coupling to an exoskeleton, discussed further below with regard to FIGS. 4B-4C.

Figure 2A:
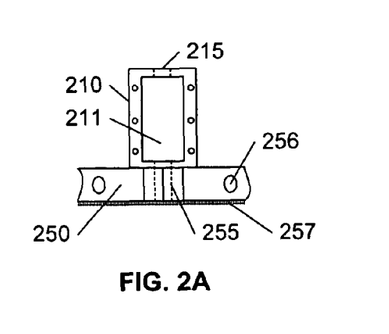
FIGS. 2A-2D illustrate details of example components of a spacecraft module in accordance with this invention.

The supports 210 are provided at the vertices in each module 200, and serve to provide a primary load path between the upper module 120 and the anchor module 110. FIG. 2A illustrates an example support 210 positioned upon a base plate 250. In a preferred embodiment, holes 215, 255 in the support 210 and base plate 250 allow for bolts and nuts to couple the modules 200 together. A recess 211 permits tool access to secure each nut and bolt. A similar coupling is used for coupling the supports to the anchor module and the upper module. Other coupling arrangements may be used; for example, threaded holes may be provided in the anchor and upper modules to receive bolts from the supports 210 in the lower and upper intermediate modules 200a, 200d. In a preferred embodiment, the anchor module includes enhanced mechanical structure, to provide stiffness to the overall stack structure, thereby reducing the mechanical structural constraints placed on each intermediate module, and thereby potentially reducing the mass of each intermediate module.

Figure 2B:
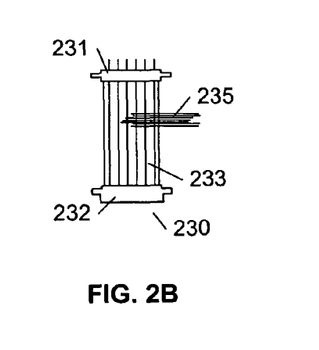
Figure 3:
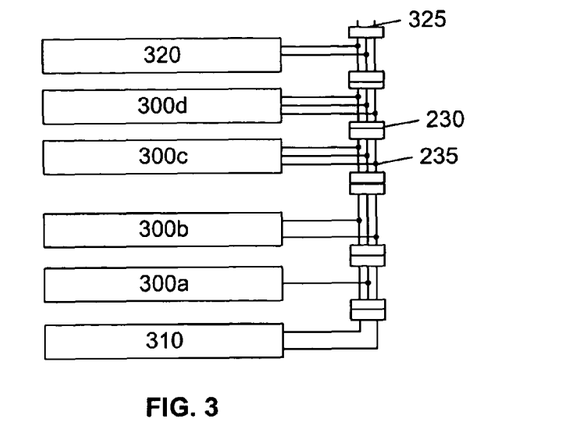
FIG. 3 illustrates an example block diagram schematic of the interconnection of components among the modules in accordance with this invention.

In a preferred embodiment of this invention, an electrical interface 230 is provided in each module 200. The electrical interface is designed to electrically couple each module 200 to a set of common electrical busses, and to provide an electronic integrity that extends across the stack of modules 200. FIG. 2B illustrates an example configuration of such an interface, and FIG. 3 illustrates an example block-diagram schematic. In this example, a multi-pin plug 231 and socket 232 are pass-through connected, and selected signal lines 235 provide coupling from the interface 230 to the functional components within the module 200 (e.g. 280 in FIG. 1B). The plug 231 of a lower module 200 in the stack plugs into the socket 232 on an upper-adjacent module 200, thereby providing a continuous electrical connection through the stack. To ease assembly, and to avoid "tolerance build-up", the plug 231 and socket 232 are preferably mounted on the support post 210 with pliant coupling devices, wherein these pliant devices allow for movement of the plug and socket combination in multiple dimensions.

Although a pass-through connection from the socket 232 to the plug 231 is illustrated, for convenience, one of ordinary skill in the art will recognize that functional elements may be coupled in series between the socket 232 and the plug 231. For example, some or all of the modules 200 may provide a "repeater" or "signal conditioning" function, wherein the input from a set of pins on the plug or socket is processed to provide a reconditioned output to a corresponding set of pins on the opposite socket or plug. However, a pass-through connection is generally preferred, because it facilitates the isolation of a faulty component without affecting the operation of other components.

Of particular note, the electrical interface 230 is preferably configured such that the electrical integrity, i.e. the ability of the modules 200 to provide their electrically-dependent functions, is substantially independent of the order arrangements of the intermediate modules 200. In a preferred embodiment, the "positional preference" of each module is taken into account when choosing a particular stacking order, but a lack of satisfaction of a module's preference does not preclude its ability to satisfy its functional requirements. For example, the MTBF (mean time between failure) of electronic components is generally known to be dependent upon the operating temperature of the components, and the operating temperature of modules 200 that are in proximity of solar panels is generally known to be higher than the operating temperature of modules 200 that are farther from the solar panels. Thus, modules 200 that have more components than other modules, and thus a potentially lower MTBF, are preferably placed farther from the solar panels. However, each module 200 in a preferred embodiment of this invention is designed to meet its operational MTBF criteria even if it is placed adjacent to the solar panels. In like manner, other module characteristics, such as preferences for unobstructed view, long or short moment arm relative to the vehicle center of mass, proximity to the payload for data exchange, and so on, can be used to provide a positional preference for determining relative or absolute positions in the stack, but each module 200 is preferably designed such that placement at any position within the stack will satisfy at least a minimal requirement for each of such preferences.

In some instances, different "versions" of a functional module 200 may be provided, and these different versions may be formed by adding 'sub-modules' to a 'basic' module. The term "sub-module" is used herein to facilitate understanding. The sub-module will generally conform to all of the constraints of a module 200 as defined herein, such that a coupling of sub-module F to the basic module forms an integral module 200 for inclusion in the stack. With regard to thermal management, for example the sub-module may be an insulation module that provides additional insulation to the basic module when the module A happens to be placed at a 'high-temperature location', such as near solar panels. In like manner, a sub-module may be a module that contains "anchor" elements to allow the basic module to function as the anchor module, as discussed further below.

In a preferred embodiment of this invention, the electrical interface 230 includes a plurality of lines/pins that provide power to the modules, one or more sets of lines/pins that provide communications among the modules, and one or more lines/pins that provide control and/or monitoring signals among the modules. Copending U.S. patent application Ser. No. 11/151,909, "SPACECRAFT NETWORK ARCHITECTURE", filed concurrently for McDermott et al., and incorporated by reference herein, discloses a spacecraft network architecture that is particularly well suited for use in a distributed-management and/or variable-resource spacecraft system. In this copending application, a component that requires a resource or service broadcasts a request for the resource or service; components that can provide the resource or service announce their availability, and the requesting component thereafter selects from among the available providers to receive the resource or service. The disclosed architecture also includes preferred power distribution and control schemes, as well as techniques for assembling functional modules based on functional requirements.

The power pins of the interface 230 generally provide multiple power sources, with a regulated voltage for routine low-power elements, such as network-interface elements, and an unregulated current source, to allow each component to provide the appropriate voltages and degrees of regulation for its needs. In some embodiments, the 'regulation' of the voltage may merely include assuring that the voltage does not exceed the maximum voltage level specified for the interface 230. As discussed further within, the anchor module 110 is particularly well suited as the module that provides the solar panels, and such an anchor module 110 may also include the voltage and power control components required to provide the power to the interface 230. Each module 200 that is coupled to a power pin of the interface 230 preferably includes a current sensor that is configured to decouple the module from the electrical interface if current above a threshold value is detected, to prevent a short in one module from affecting the operation of the other modules. In a preferred embodiment, the power-supply component is configured to be able to terminate power to any component, or otherwise decouple the component from the interface 230, to prevent anomalous behavior of the component from affecting other components.

The communication pins of the interface 230 preferably provide at least a relatively low-speed communication channel, using, for example, the I²C standard and protocol. In a preferred embodiment, an inverse I²C channel is also provided, to provide common-mode noise rejection. Preferably, the I²C link layer is used with the inverse-channel principles of the CANbus physical layer to provide this complementary I²C channel. Additionally, an Ethernet, Firewire, or other high-speed communication channel will also be provided via the interface 230.

The control and monitoring pins of the interface 230 include, for example, a synchronization signal that facilitates synchronization among the components, a signal that indicates whether the spacecraft is in a 'launch' mode or a 'deployed' mode, and/or whether the spacecraft is operating under reduced power-available conditions.

On most modules 200, the relative location of the interface 230 is immaterial to the function of the module. However, in some modules, such as modules that include sensors on the perimeter of the module, the rotational-orientation of one module relative to another may affect the performance of the module. For example, a "viewing" sensor's field of view may be substantially limited if the sensor is mounted on the wall of the spacecraft that also includes a solar panel. For such modules, either redundant interfaces 230 are placed at multiple vertices of the module 200, or the interface 230 on the module is configured to be mountable onto multiple alternative supports 210. Preferably, the module 200 is configured to determine and report its rotational orientation, to facilitate verification tests before launch, and/or to determine the field of view of components within the module during operation. Example techniques for determining relative location and orientation are presented below, with reference to FIG. 7.

Note that not all of the electrical connectivity of the modules 200 need be provided via the interface 230. Some modules may have signal lines that have requirements that cannot be accommodated by the standard interface 230. For example, the signal lines that couple an S-band radio to externally mounted antenna will typically require low-loss lines with RF-shielding, which may not be provided by the standard interface 230. In a preferred embodiment of such modules, one or more sockets 282 are optionally mounted on the external surface 220, and an external connection between the modules is provided after the stack is assembled. With specific regard to radio systems, the anchor module 110 is typically well suited for mounting antennas and other external components, on its lower surface area.

The placement of functional components in the anchor 110 and upper 120 modules is illustrated by components 310 and 320 in FIG. 3. As also illustrated in FIG. 3, the interface 230, or a subset thereof, is also provided via a connector 325 in the upper module to the payload (130 of FIG. 1). Generally, because each spacecraft will have one lower-most, i.e. anchor, component, electrical or structural functions that require one instantiation of an item, such as line-termination elements, "pull-up" or "pull-down" elements, reference datum, launch vehicle interface, and so on, are preferably located at the anchor module 110. Preferably, any component can be configured as the anchor component, either as a specifically designed 'anchor version' of the component, or via the addition of an anchoring sub-module that contains the aforementioned typical anchor-elements.

Figure 2C:
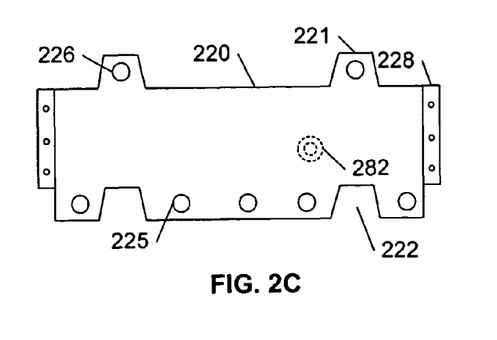

FIG. 2C illustrates an example perimeter plate 220. The example perimeter plate 220 is configured to attach to the base plate (250 of FIG. 2A) using bolts that pass through holes 225 in the perimeter plate to threaded holes (226 in FIG. 2A) in the base plate 250. Preferably, tabs 228 are provided for coupling the perimeter plate 220 to the support posts 210, thereby providing additional lateral support to the posts 210.

Optionally, some or all of the perimeter plates 220 may include reinforcing ribs, to provide additional mechanical support. To facilitate alignment of the modules 200 in the stack, and to further enhance the structural integrity of the stack, each plate 220 has tabs 221 and corresponding recesses 222 that allow each plate 220 to couple to a base plate of an adjacent module 200. With the example tabs 221 and recesses 222 illustrated, the upper module 120 is preferably configured to allow for coupling of the upper module 120 to the uppermost module 200 via the tabs 221, and the anchor module 110 preferably includes tabs 221 for coupling to the base plate 250 of lowermost module 200.

Because thermal management is often one of the most challenging constraints in modular design, each module 200 in a preferred embodiment is designed to be thermally self-sufficient, such that the heat from a module does not affect adjacent modules. Thus, the coupling of the perimeter plates 220 to the adjacent base plates preferably includes insulated components to minimize thermal transfer. Preferably, each spacecraft module is designed to maintain its own thermal environment, as described further below, without a priori knowledge of the thermal characteristics of the other modules it may be placed with.

Figure 2D:
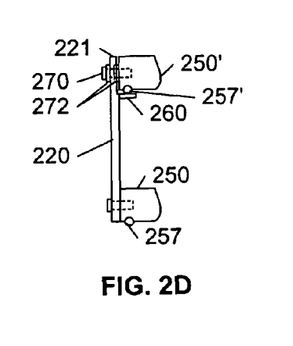

FIG. 2D illustrates an example configuration of a wall panel 220 that is configured to maintain thermal isolation between the wall panel 220 and a base plate 250' of an adjacent module. Preferably an insulating gap is maintained between the wall panel 220 and the base plate 250'; a layer of insulation material may provide for this gap. The bolt 270 that couples the panel 220 to the adjacent base plate 250', at tab 221, is installed with insulation washers 272 that insulate the bolt head from the wall panel 220, and insulate the panel 220 from the base plate 250'.

Although the use of an insulation gap and an insulated coupling arrangement provides excellent thermal isolation, consideration must be made for electrical conduction along the walls and other chassis surfaces of the spacecraft, and particularly between the surfaces of adjacent modules. The vacuum of space causes potentially damaging discharges to occur if two neighboring metallic surfaces are allowed to go to different voltage potentials, and the radio performance of spacecraft is optimized if the spacecraft exterior surfaces appear as consistent equi-potential planes. Preferably, a thermally insulating but electrically conducting path is preferably provided between modules.

FIG. 2D illustrates an example embodiment that provides electrical conductivity, with substantially less thermal conductivity. A conductive shelf 260 is provided along the interior of the wall panel 220. This shelf 260 is configured to contact a flexible thin-wire interface 257' on the baseplate 250' of the module above. Using flexible thin-wire, such as a spiral shield, creates a good electrical contact through many thin metal conductors spaced relatively widely apart, but creates a poor thermal contact because the total amount of material connecting the two modules is minimal. The baseplate 250 of each module is configured to contain the thin-wire interface 257, and the shelf 260 is positioned such that the interface 257' of an adjacent baseplate 250' is under compression when the wall panel 220 is coupled to the adjacent baseplate 250'. Because the wall plates 220 and the baseplate 250 are metallic, and not insulated from each other when assembled, the coupling of each wall panel 220 to each adjacent baseplate 250' provides for a substantially uniform potential on each surface of each module.

Conventionally, iriditing is used to make metallic (especially Aluminum) surfaces conductive for space use. Although iridited coatings are easily scratched and corroded, iriditing is an efficient process that is well suited for conventional spacecraft. Conventional spacecraft are typically assembled once for launch, and the coupled iridited surfaces are not subject to abrasion or corrosion. However, because repeated compressive contact with a thin-wire interface 257 will be abrasive to the shelf 260, and because modules may be assembled and disassembled multiple times for testing, payload integration, and pre-launch module replacement (to install a fresh battery pack immediately prior to launch, for example); and further because spacecraft modules of this type may be stored in inventory for extended periods awaiting use, iriditing is not suitable. In a preferred embodiment, the shelf 260 is coated with a harder surface coating, such as nickel plating.

Preferably, to maintain a desired thermal environment in a module 200, the base plate 250 and perimeter plates 220 conform to the principles and techniques disclosed in copending U.S. patent application Ser. No. 11/151,908, "SPACECRAFT MODULE WITH ENHANCED THERMAL TRANSFER CAPABILITY", filed concurrently for Barton et al., and incorporated by reference herein. In accordance with this copending application, the base plate includes uniformly placed thermal channels that couple the heat generated in the center area of the base plate to thermal-conductive perimeter plates that are uniformly distributed about the perimeter of the spacecraft, thereby allowing for efficient thermal transfer to the external environment regardless of the spacecraft's orientation. Preferably, the thermal-conductive perimeter plates are placed at locations that are not within the reflective field of the solar panels. Because the length of the perimeter plates is constrained by the distance between vertices of the module 200, a sufficient thermal-transfer area is achieved by adjusting the height of the module 200.

In a preferred embodiment of this invention, each module 200 is constrained so as not to extend beyond the vertical extent (height) of the module 200. That is, any external components that are attached to a module 200 may not extend into the vertical-space of any other module 200. This constraint further facilitates the placement of each module 200 at any location in the stack, knowing that it will not interfere with, or be interfered by, some other module 200 in the stack. Consistent with this constraint, the upper module 120 is preferably constrained to not extend downward into the vertical-space of the stack of modules 200. As noted above, the height of a module 200 is generally determined based on the thermal-transfer requirements for the module, and this constraint generally affects the placement of the external component. However, if a module 200 includes an external component that is larger than the height of the module, or otherwise infringes on the vertical space of another module, the height of the module should be adjusted accordingly.

The anchor module 110 is also preferably constrained to not extend upward into the vertical-space of the stack of modules 200. However, this constraint may be relaxed to accommodate the arrangement of solar panels in a launch configuration, as illustrated in FIG. 4A.

Figure 4A:
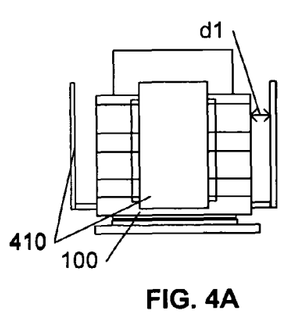
FIGS. 4A-4C illustrate example spacecrafts, with and without an exoskeleton in accordance with an aspect of this invention.

FIG. 4A illustrates an arrangement of a spacecraft 100 using conventional fold-away solar panels 410. In a conventional design, the design of each module must be coordinated, so as to avoid interference with the solar panels, or other external components. To facilitate modular design, the constraints placed on modules 200 preferably include a distance d1 beyond which external elements of the module 200 are not permitted to extend. If all of the modules 200 conform to this constraint, an anchor module with fold-away solar panels 410 can be designed independently of the particular modules 200 that form the stack.

As is well known in the art, however, the use of fold-away solar panels requires a substantial amount of design effort, because these external panels 410 introduce a substantial moment-arm factor that must be taken into account in the mechanical design of the entire spacecraft. In a modular design, each module 200 must be capable of supporting the remainder of the stack of modules in the presence of the forces that the panels 410 introduce during launch, and during deployment.

In a preferred embodiment, the solar panels are stored within the module stack during launch, thereby avoiding the mechanical difficulties introduced by external panels. Techniques for providing such internally-stored panels are presented below with regard to FIGS. 5A-5B and 6A-6C.

Figure 4B:
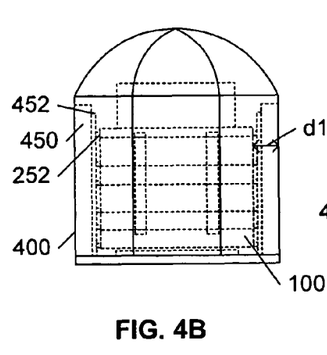
Figure 4C:
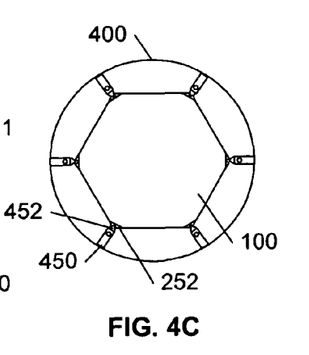

To further reduce the mechanical/structural requirements of each module, the modules are preferably configured to facilitate the use of an exoskeleton 400, as illustrated in FIGS. 4B and 4C. The exoskeleton is configured to provide for the allowable extent d1 of external components of the modules, except at the vertices, where the exoskeleton couples to the spacecraft 100. As noted above with regard to FIG. 2A, the modules 200 are constrained to allow access to the elements that couple the modules at each vertex, and this same clearance area is used as the area for coupling the exoskeleton.

As illustrated in FIG. 1B, the baseplate 250 of each module includes V-shaped notches 252 at each vertex, which are also indicated in FIGS. 4B-4C. These V-shape notches may also or alternatively be provided via a cover-piece that covers the opening 211 in the support post 210. The exoskeleton 400 includes columns 450 that include extendable elements 452 that are configured to fit into the V-shaped notch 252 of each baseplate. As the elements 452 are extended radially inward, they serve to align the modules within the exoskeleton, and with continued extension, clamp the spacecraft in place, so that the structural support required during launch will be provided by the exoskeleton.

In a preferred embodiment, the column 450 and elements 452 provide the required radially inward clamping force by using a technique similar to that used by conventional wedge clamps, such as defined in U.S. Pat. No. 4,354,770, "WEDGE ASSEMBLY", issued 19 Oct. 1982 to Sheldon A. Block, and incorporated by reference herein. In an example embodiment, the column 450 includes a channel within which opposite-facing trapezoidal elements (wedge clamps) are placed, some of these elements forming the elements 452 that extend beyond the column 450. A screw assembly provides a compressive force to the stack of trapezoidal elements, causing them to slide away from each other, thereby causing the elements 452 to extend further beyond the column 450. With continued compressive force on the stack, the elements 452 engage the V-shaped notch 252 in each of the baseplates and exert the desired radially-inward force onto these baseplates. Other techniques for providing a radially-inward force from a column 450 to the spacecraft 100 may be used, but the use of wedge clamps has been shown to be particularly effective and efficient for this task, because it requires only the turning of a screw at each vertex to provide the coupling, and allows each module to move freely in two directions prior to clamping, thereby compensating for misalignments and assuring proper contact during clamping.

By providing the structural support via the exoskeleton, each module 200 need not be designed to provide the support, and therefore can be designed using less massive materials. When the spacecraft 100 is deployed, the exoskeleton 400 is shed, thereby substantially reducing the mass of the deployed spacecraft and allowing for easier attitude control and less energy-consuming maneuvers in orbit. Additionally, because the exoskeleton 400 is shed, it need not be designed to last for the entire mission-life of the spacecraft 100, and can also be configured to use less costly and less massive materials, particularly the materials used for the outer skin, if any.

FIGS. 5A-5B and 6A-6C illustrate two example alternatives for providing solar panels that do not exceed the diameter of the stack during launch.

Figure 5A:
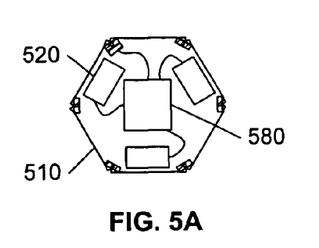
FIGS. 5A-5B and 6A-6C illustrate example solar panel modules in accordance with an aspect of this invention.
Figure 5B:
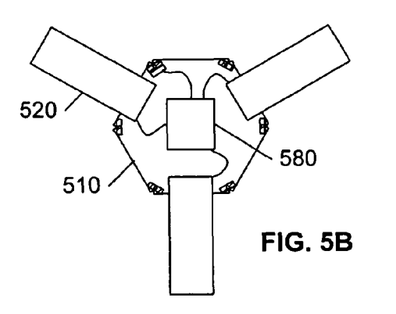

In FIG. 5A, the solar panels 520 comprise a flexible material that is rolled or folded into a compact form within a module 510, typically the anchor module of a stack. The flexible material may include a spring structure that is held under tension when stored for launch, and released to deploy the panel 520, or it may include an inflatable member which, when inflated, extends the panel 520 to its deployed position. FIG. 5B illustrates the panels 520 in a deployed state.

Figure 6A:
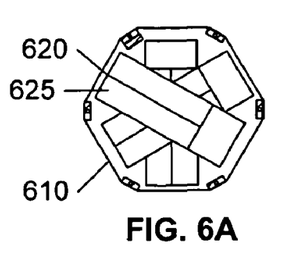
Figure 6B:
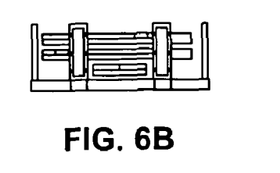
Figure 6C:
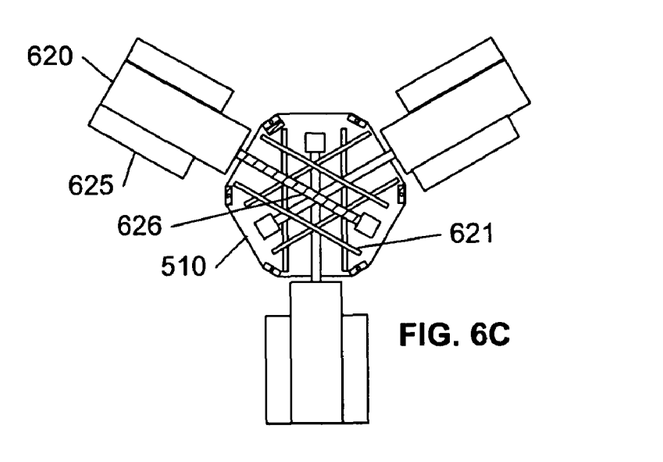

FIGS. 6A-6C illustrate an alternative embodiment of a solar panel module 610. FIGS. 6A and 6B illustrate top and side views of the module 610 when the solar panels 620 are stored, and FIG. 6B illustrates the module 610 when the solar panels 620 are deployed. Rigid solar panels 620 are arranged on tracks 621 (not illustrated in FIGS. 6A-6B, for clarity) within the module 610, and are configured to be extended and unfolded when deployed. The use of rigid panels allows for the use of conventional solar panel material.

The panels 620 are illustrated as being deployed using a linear screw mechanism 626, illustrated in FIG. 6C, although other conventional techniques for lateral deployment of a device can be used, such a scissor-jack, a compressed spring, and so on. In a preferred embodiment, the deployment mechanism is also configured to provide control of the orientation of the solar panels after deployment, thereby avoiding the need to provide a separate orientation-control mechanism. In the example of FIG. 6C, the screw mechanism 626 is configured to provide a latching action, such that, after deployment, the orientation of the solar panels 620 can be adjusted by controlling/turning the screw.

Note that FIGS. 5A-5B and 6A-6C are provided for illustrative purposes, and one of ordinary skill in the art will recognize other alternatives for containing solar panels within a given diametric constraint in view of this disclosure. One of ordinary skill in the art will also recognize that the concepts of FIGS. 5A-5B and 6A-6C are not limited to solar panels, and may be used for other components, such as antennas. In like manner, the use of folded wings 625 on each panel 620 to increase the surface area is optional, and is not limited to the example structure of FIGS. 6A-6C. Wings and other shapes that increase surface area may be used, for example, in the example flexible structure of FIGS. 5A-5B.

As noted above, the module that contains the solar panels 520 may also be configured to provide power to the common electrical interface 230. FIGS. 5A-5B illustrate a component 580 that receives power from the solar panels 520 and provides power to the interface 230; component 580 may also include batteries that are configured to provide power in the absence of power from the solar panels and to store power received from the solar panels. In a preferred embodiment, the component 580 provides multiple power sources, optionally with differing degrees of regulation. The module 610 of FIGS. 6A-6C may similarly be configured with components to provide power to the common electrical interface 230, but such components are omitted from FIGS. 6A-6C for clarity.

Figure 7:
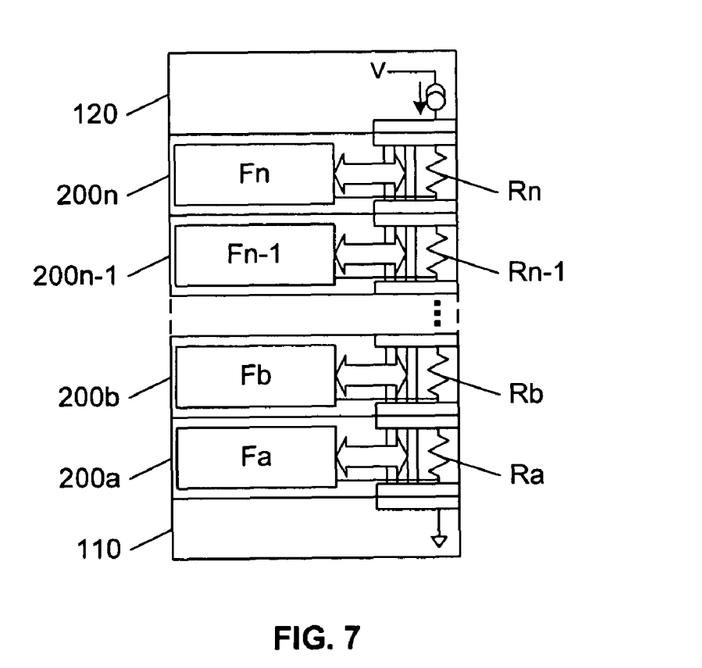
FIG. 7 illustrates an example block diagram of a location-determination system in accordance with this invention.

FIG. 7 illustrates an example block diagram of a location-determining system for determining a relative location of each module in the stack. In the example of FIG. 7, the network interconnection includes a line in which each module 200a-200n inserts a series resistor Ra-Rn. Modules 110, 120 provide a constant current for this series-resistance path, so that a measure of the voltage Va-Vn at each module 200a-200n provides an indication of the module's position in the stack. If all of the resistors Ra-Rn are equal, these voltages will be indicative of the order in which the module is located on the stack. For example, if a 1 ma current is provided, and each resistor is 1000 ohms, there will be a one volt increment at each level of the stack.

In a preferred embodiment, each module resistor Ra-Rn is sized to be proportional to the height of the module 200a-200n, so that a measure of the voltage provides a measure of the actual vertical position of each module. For example, each hundred ohms could represent one centimeter, so that with a 1 ma current source, if module 200a is 8 cm tall, Ra will be 800 ohms, and voltage Vb will be 0.8 volts, indicating that the base of module B is 8 cm above the lower module 110. Optionally, the lower module 110 may also include a resistor (not shown) that provides a measure of the height of the first module 100a relative to the vertical origin of the spacecraft. Other location-determining techniques will be evident to one of ordinary skill in the art in view of this disclosure.

Similarly, modules that allow for placement of the connector 230 (FIG. 1B) on alternative vertices, to allow the sides of the module 200 to be re-oriented relative to the location of the backbone connection (and hence relative to other modules on the stack), preferably contain a means of determining which vertex of the module corresponds to the backbone of the stack. Each vertex that is permitted to be aligned with the backbone, for example, can be configured with a means for sensing the presence of the connector 230, such as a microswitch, a conductive 'finger' that contacts a part of the connector 230, and so on. Alternatively, each vertex may be configured to provide a unique signal on one of the wires 235 that couple the connector 230 to the components 280. Other orientation-determining techniques will be evident to one of ordinary skill in the art in view of this disclosure.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the example embodiments are presented in the context of a spacecraft bus that hosts a payload, one of ordinary skill in the art will recognize that the principles of this invention can be used to provide payload systems or other systems that may comprise a number of selectable modules. For example, a variety of payload systems may include the need for a detection function (such as a camera, IR sensor, and so on), a memory function (to store the detected information), and a steering function (to track the source of the detected information). Different missions may require different detection functions, but the memory and steering functions can be provided in pre-designed and tested modules in accordance with this invention. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

We claim:

1. A spacecraft system comprising a stack of modules, the stack of modules including:
an anchor module,
an upper module, and
a plurality of intermediate modules arranged between the anchor module and the upper module,
wherein:
each intermediate module of the plurality of intermediate modules provide a common mechanical interface and a common electrical interface, such that a coupling of each intermediate module to its adjacent modules provides a structural integrity and an electronic integrity that extends across an entirety of the stack of modules, and
each intermediate module is configured to be substantially thermally isolated from other modules on the stack.

2. The spacecraft system of claim 1, wherein the structural integrity and electronic integrity is substantially unaffected by an order of arrangement of the intermediate modules between the anchor module and the upper module.

3. The spacecraft system of claim 1, wherein the electronic interface is further structured such that power distribution among the plurality of intermediate modules is unaffected by an order of arrangement of the intermediate modules between the anchor module and the upper module.

4. The spacecraft system of claim 1, wherein the intermediate modules provide a plurality of functional capabilities, and
the plurality of functional capabilities are substantially unaffected by an order of arrangement of the intermediate modules.

5. The spacecraft system of claim 1, wherein the intermediate modules include a power supply module that is configured to provide power to each of the other intermediate modules via the coupling of the electrical interface between adjacent intermediate modules.

6. The spacecraft system of claim 5, wherein the anchor module includes one or more solar panels, operably coupled to the power supply module to provide power to the power supply module.

7. The spacecraft system of claim 1, wherein:
each intermediate module is generally structured as a polygon, and
each intermediate module includes corner posts at each vertex that are configured to be coupled to an adjacent module on the stack of modules, to provide a primary load path between the upper module and the anchor module.

8. The spacecraft system of claim 1, wherein:
each intermediate module is generally structured as a polygon, and
one or more walls of the polygon includes ribs that provide structural support.

9. The spacecraft system of claim 8, wherein the ribs also facilitate thermal transfer.

10. The spacecraft system of claim 1, wherein:
each intermediate module is generally structured as a polygon,
one or more walls of the polygon are structured to facilitate thermal transfer, and
a height of at least one of the intermediate modules is determined based on the thermal transfer provided by the one or more walls of the polygon.

11. The spacecraft system of claim 1, wherein each intermediate module is generally structured as a hexagon.

12. The spacecraft system of claim 1, wherein protrusions from each module, in a launch position, are constrained to within a height of the module.

13. The spacecraft system of claim 1, wherein the electrical interface of the intermediate modules includes a plug and a socket for coupling to a corresponding socket and plug on adjacent modules on the stack.

14. The spacecraft system of claim 13, wherein at least one of the plug and socket are mounted on each intermediate module using pliant couplings to facilitate the coupling to the corresponding socket and plug.

15. The spacecraft system of claim 1, wherein the anchor module includes a coupling device that facilitates coupling the spacecraft system to a launch vehicle.

16. The spacecraft system of claim 15, wherein the upper module provides a support base for one or more payload components.

17. The spacecraft system of claim 1, wherein the stack of modules includes:
a communications module,
an attitude determination module,
an attitude control module,
a power supply module, and
a solar panel module.

18. The spacecraft system of claim 1, further including an exoskeleton that is configured to absorb launch loads and configured to be separable from the stack of modules after launch.

19. The spacecraft system of claim 18, wherein the exoskeleton is configured to couple to the stack of modules via columns that provide radially-inward forces to at least two modules of the stack of modules.

20. The spacecraft system of claim 18, wherein the exoskeleton is configured to couple to the stack of modules via wedge clamps.

21. The spacecraft system of claim 20, wherein each module of the stack of modules is configured to include recesses that are configured to receive the wedge clamps.

22. The spacecraft system of claim 1, wherein the electrical interface includes an $I^2C$ data bus with an inverse channel.

23. The spacecraft system of claim 1, wherein each intermediate module includes a current sensor that is configured to decouple the module from the electrical interface if current above a threshold value is detected.

24. The spacecraft system of claim 1, wherein each intermediate module is configured to respond to a request for services from any other module.

25. The spacecraft system of claim 1, wherein the anchor module includes one or more line-termination components operably coupled to the common electrical interface.

26. The spacecraft system of claim 1, wherein the anchor module includes one or more solar panels.

27. The spacecraft system of claim 26, wherein the one or more solar panels are configured to be contained substantially within the anchor module.

28. The spacecraft system of claim 27, wherein the anchor module includes one or more lateral deployment mechanisms that are configured to deploy the one or more solar panels after launch.

29. The spacecraft system of claim 28, wherein the one or more deployment mechanisms are further configured to control an orientation of the one or more solar panels after the one or more solar panels are deployed.

30. The spacecraft system of claim 26, wherein the anchor module includes one or more batteries operably coupled to the solar panels and to the common electrical interface.

31. The spacecraft system of claim 26, wherein the anchor module includes a voltage regulator that receives power from the one or more solar panels and provides at least one regulated supply voltage to the common electrical interface.

32. The spacecraft system of claim 1, wherein the anchor module includes one or more antennas.

33. The spacecraft system of claim 1, wherein each intermediate module is configured to provide a thermal integrity that is independent of an order of arrangement of the modules on the stack.

34. The spacecraft system of claim 1, wherein each intermediate module is configured to provide an electrically conductive path between surfaces of adjacent modules, so as to maintain a substantially uniform potential across and among all surfaces of the stack of modules.

35. A spacecraft system comprising a stack of modules, the stack of modules including:
an anchor module,
an upper module, and
a plurality of intermediate modules arranged between the anchor module and the upper module,
wherein:
each intermediate module of the plurality of intermediate modules provide a common mechanical interface and a common electrical interface, such that a coupling of each intermediate module to its adjacent modules provides a structural integrity and an electronic integrity that extends across an entirety of the stack of modules,
each intermediate module is generally structured as a polygon, with a plurality of tabs and a plurality of recesses on a periphery of the polygon, and
the plurality of tabs are configured to couple to corresponding plurality of recesses in an adjacent module on the stack of modules.

36. A spacecraft system comprising a stack of modules, the stack of modules including:
an anchor module,
an upper module, and
a plurality of intermediate modules arranged between the anchor module and the upper module,
wherein:
each intermediate module of the plurality of intermediate modules provide a common mechanical interface and a common electrical interface, such that a coupling of each intermediate module to its adjacent modules provides a structural integrity and an electronic integrity that extends across an entirety of the stack of modules, and
each intermediate module includes one or more elements that facilitate a determination of the intermediate module's relative location on the stack of modules.

37. 1 A spacecraft system comprising a stack of modules, the stack of modules including:
an anchor module,
an upper module, and
a plurality of intermediate modules arranged between the anchor module and the upper module,
wherein:
each intermediate module of the plurality of intermediate modules provide a common mechanical interface and a common electrical interface, such that a coupling of each intermediate module to its adjacent modules provides a structural integrity and an electronic integrity that extends across an entirety of the stack of modules, and
each intermediate module includes one or more elements that facilitate a determination of the intermediate module's relative orientation within the stack of modules.

38. A spacecraft system comprising a stack of modules, the stack of modules including:
an anchor module,
an upper module, and
a plurality of intermediate modules arranged between the anchor module and the upper module,
wherein
each module of the plurality of intermediate modules:
has a common cross-section profile that is substantially hexagonal in form, and
provides a common mechanical interface, such that a coupling of each intermediate module to its adjacent modules provides a structural integrity that extends across an entirety of the stack of modules.

39. The spacecraft system of claim 38, wherein the structural integrity is substantially unaffected by an order of arrangement of the intermediate modules between the anchor module and the upper module.

40. The spacecraft system of claim 38, including an electronic interface that provides power distribution among the plurality of intermediate modules and is unaffected by an order of arrangement of the intermediate modules between the anchor module and the upper module.

41. The spacecraft system of claim 40, wherein the anchor module includes one or more solar panels that provide power to the plurality of intermediate modules.

42. The spacecraft system of claim 41, wherein each intermediate module includes a plurality of tabs and a plurality of recesses on a periphery of the module, and the plurality of tabs are configured to couple to corresponding plurality of recesses in an adjacent module on the stack of modules.

43. The spacecraft system of claim 38, wherein each intermediate module includes corner posts at each vertex of the module that are configured to be coupled to an adjacent module on the stack of modules, to provide a primary load path between the upper module and the anchor module.

44. The spacecraft system of claim 38, wherein:
one or more walls of each intermediate module are structured to facilitate thermal transfer, and
a height of at least one of the intermediate modules is determined based on the thermal transfer provided by the one or more walls.

45. The spacecraft system of claim 44, wherein the one or more walls are structured to provide low-impedance electrical conductivity to walls of adjacent modules in the stack.

46. The spacecraft system of claim 45, wherein the one or more walls are structured to provide thermal isolation from adjacent modules in the stack.

47. The spacecraft system of claim 38, wherein each intermediate module includes a plug and a socket for coupling to a corresponding socket and plug on adjacent modules on the stack of modules.

48. The spacecraft system of claim 38, wherein the anchor module includes a coupling device that facilitates coupling the spacecraft system to a launch vehicle.

49. The spacecraft system of claim 38, wherein the upper module provides a support base for one or more payload components.

50. The spacecraft system of claim 38, further including an exoskeleton that is configured to absorb launch loads and configured to be separable from the stack of modules after launch.

51. The spacecraft system of claim 50, wherein the exoskeleton is configured to couple to the stack of modules via columns that provide radially-inward forces to at least two modules of the stack of modules.

52. The spacecraft system of claim 50, wherein the exoskeleton is configured to couple to the stack of modules via wedge clamps.

53. The spacecraft system of claim 52, wherein each module of the stack of modules is configured to include recesses that are configured to receive the wedge clamps.

54. The spacecraft system of claim 38, wherein each intermediate module includes a locator component that facilitates a determination of the intermediate module's relative location on the stack of modules.

55. The spacecraft system of claim 38, wherein the anchor module includes one or more line-termination components operably coupled to a common electrical interface.

56. The spacecraft system of claim 38, wherein the anchor module includes one or more antennas.

57. A spacecraft module that includes:
a function component,
an electrical interface to the function component, and
a mechanical interface,
wherein:
the mechanical interface is configured to couple the spacecraft module in series between a pair of adjacent modules, independent of a function of each of the adjacent module, and to provide a structural integrity to the pair of adjacent modules and the spacecraft module,
the electrical interface is configured to couple each of the pair of adjacent modules to the function component and to each other, and
the module is configured to be substantially thermally isolated from the adjacent modules.

58. The spacecraft module of claim 57, wherein the spacecraft module has a profile that is substantially similar to a profile of each of the adjacent modules.

59. The spacecraft module of claim 58, wherein the profile is substantially hexagonal.

60. The spacecraft module of claim 57, wherein the mechanical interface includes posts at each vertex of the spacecraft module that serves to couple the spacecraft module in series between the pair of adjacent modules.

61. The spacecraft module of claim 60, wherein the spacecraft module includes a recess at each vertex that is configured to facilitate coupling of the module to an exoskeleton.

62. The spacecraft module of claim 57, further including one or more elements that facilitate a determination of a location of the module relative to the adjacent modules.

63. The spacecraft module of claim 57, further including one or more elements that facilitate a determination of an orientation of the module relative to the adjacent modules.

64. The spacecraft module of claim 57, wherein the mechanical interface includes a plurality of sidewalls.

65. The spacecraft module of claim 64, further including a plurality of sidewalls that facilitate thermal transfer, and wherein a height of the module is dependent upon an amount of thermal transfer provided by the plurality of sidewalls.

66. The spacecraft module of claim 57, wherein the module is configured to provide thermal control of the function component.

67. The spacecraft module of claim 57, further including a plurality of sidewalls, each sidewall of the plurality of sidewalls being configured to include at least one element that facilitates electrical contact with at least one of the adjacent modules.

68. The spacecraft module of claim 67, wherein the electrical contact is provided via thin strands of conductive material.

69. The spacecraft module of claim 67, wherein the electrical contact is provided via a coil of conductive material arranged between the at least one element of the sidewall and a baseplate of one of the adjacent modules.

70. The spacecraft module of claim 67, wherein the at least one element that facilitates electrical contact is coated with electrically conductive material that is resistant to abrasion.

71. The spacecraft module of claim 70, wherein the at least one element includes nickel plating.

72. The spacecraft module of claim 67, further including a baseplate that is configured to include at least one element that facilitates electrical contact with at least one of the adjacent modules.

73. The spacecraft module of claim 72, wherein the electrical contact is provided via thin strands of conductive material arranged between the baseplate and one or more walls of one of the adjacent modules.

74. A spacecraft module comprising:
a plurality of solar panels that are arranged:
to be stored substantially within an interior of the spacecraft module during a launch of the spacecraft module, and
to be deployed substantially exterior to the spacecraft module after the launch of the spacecraft module, and
a plurality of deployment mechanisms that are configured to extend the panels in the radial direction during deployment,
wherein:
the plurality of solar panels include substantially rigid panels that are configured to be extended in a radial direction from the interior of the spacecraft during deployment, and
the plurality of deployment mechanisms are also configured to provide control of an orientation of the plurality of panels after deployment.

* * * * *